Oct. 14, 1958 A. ORCEL 2,856,221
FASTENING DEVICE
Filed May 2, 1956 2 Sheets-Sheet 1
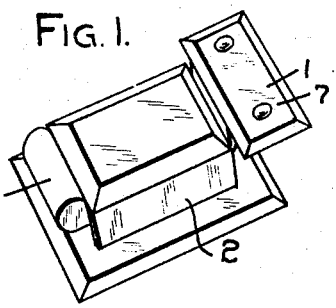
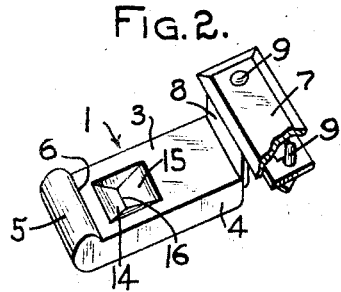
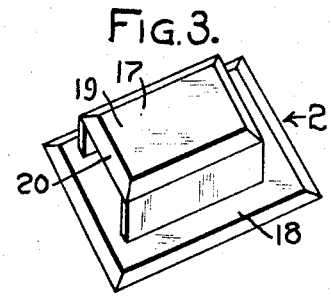
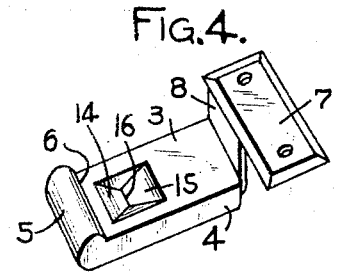
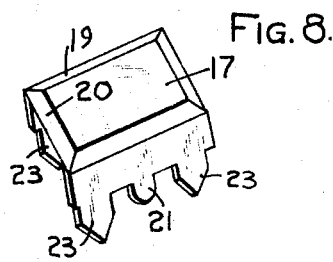
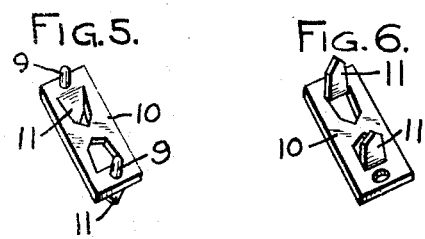
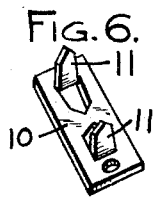
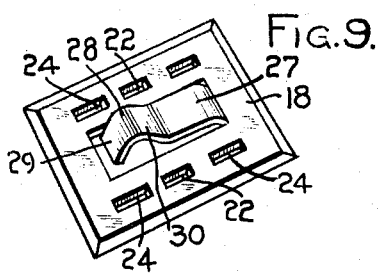
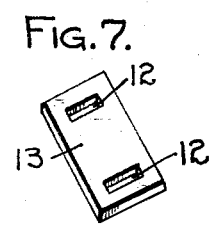
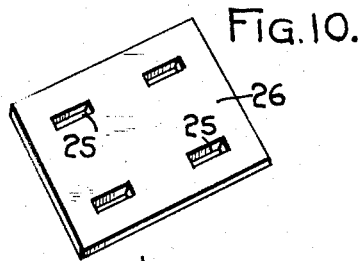
INVENTOR:
AIMÉ ORCEL,
BY Philip E. Parker
ATTORNEY.

Oct. 14, 1958
A. ORCEL
2,856,221
FASTENING DEVICE
Filed May 2, 1956
2 Sheets-Sheet 2
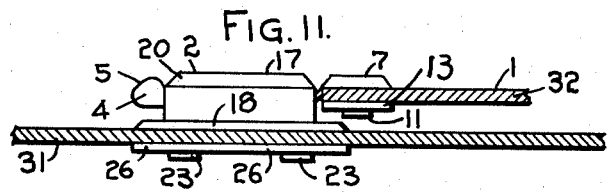
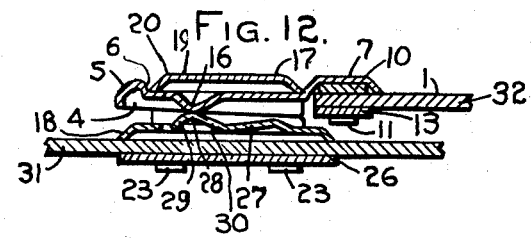
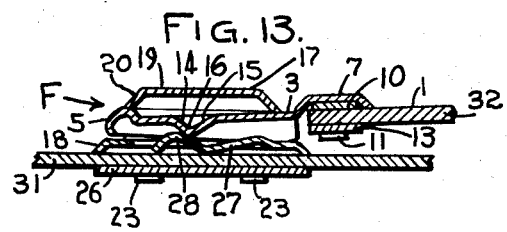
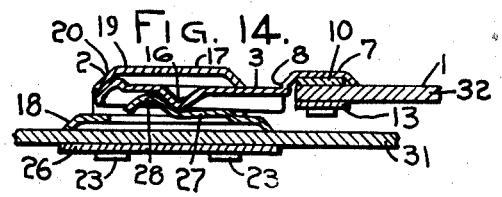
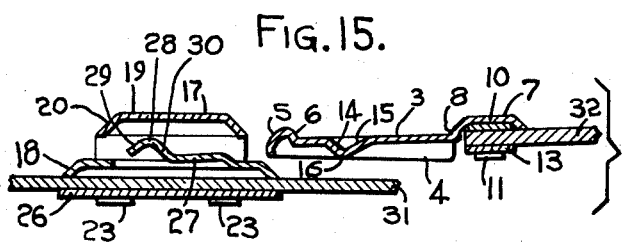
INVENTOR:
AIMÉ ORCELL,
By Philip E. Parker
ATTORNEY.

2,856,221

FASTENING DEVICE

Aimé Orcel, St Martin d'Heres, France, assignor to
A. Raymond, Grenoble, France, a firm Application May 2, 1956, Serial No. 582,204

Claims priority, application France May 10, 1955

5 Claims. (Cl. 292—303)

This invention relates generally to clasps for brief cases, carrying cases and the like.

It is customary to close brief cases, carrying cases or analogous objects by fastening a mobile part onto the main body of the object by means of a metal clasp device including essentially a male part fixed to the mobile part and a female part fixed to the body of the object, means being provided to assure that the male part is maintained inside the female part in closed position.

Such a device must be simple and strong, and the process of opening and closing it should require as little work as is possible on the part of the operator.

The present invention has as its subject a clasp device which presents these aforesaid advantages. The device includes a male part constituted by a tongue presenting a projection on its upper face, which projection cooperates, in closed position, with the forward rim of the female part (the case), a spring pressing the male tongue under the upper face of the case in such a way as to assure that the tongue is locked into closed position, while allowing the operator to disengage the male part by simple pressure exerted on the end of the tongue.

According to a preferred embodiment of the invention the male tongue is provided, under its upper face, with an outstanding boss presenting two inclined flat ramps meeting along an edge perpendicular to the displacement direction of the tongue, which edge becomes placed in front of the edge of an analogous boss on the spring when the tongue is inserted in the case, in closed position.

In addition, the forward rim of the case presents an incline of about 45 degrees toward the lower face of the case and in the direction of the engagement of the male part, the projection of the tongue being formed by a roll, preferably rounded, provided at the end of the tongue.

A clasp embodying the applicant's invention opens with particular rapidity; the cooperation, on the one hand, of the inclined rim of the case and the rounded end of the tongue assures an almost automatic disengagement of the tongue through simple pressure exerted on the roll.

The description which follows refers to the appended drawings, given by way of non-limiting example, and gives a more precise understanding of how the invention can be realized, the particular features which are revealed both by the drawings and the text being, of course, part of the invention.

Fig. 1 is a perspective view of a clasp embodying the invention.

Fig. 2 is a perspective view of the male tongue of the clasp of Fig. 1.

Fig. 3 is a perspective view of the female case of Fig. 1.

Figs. 4, 5, 6 and 7 are views in perspective of various component parts of the tongue shown in Fig. 2.

Fig. 8 is a view in perspective of the bridge portion of the socket member of the female case of Fig. 3.

Fig. 9 is a view in perspective of the base of the female case of Fig. 3.

Fig. 10 is a view in perspective of an attaching plate for the female case of Fig. 3.

Fig. 11 is a profile view of the united male and female parts of the clasp in closed position.

Fig. 12 is a longitudinal section of Fig. 11.

Fig. 13 is a longitudinal section similar to Fig. 12, but showing the clasp after the start of its release.

Fig. 14 is a view in longitudinal section similar to Fig. 12, showing the release process at a later stage than that shown in Fig. 13.

Fig. 15 is a view in longitudinal section similar to Fig. 12 but showing the parts in released position.

The device represented in closed position in Fig. 1 possesses a male part 1 and female part 2. The male part, as can be seen from Figs. 2, 4, 5, 6 and 7, is constituted by a tongue 3 of rectangular shape, for example punched from a metal plate, and presenting the lateral edges 4. The tongue 3 terminates in a roll 5, rounded frontwards and projecting over the upper face of the tongue, to which latter it is connected by a ramp 6 which is practically perpendicular to the said upper face. The tongue 3 is connected at its rear to a plate 7 which permits it to be attached to the mobile flap of the brief case or any other object equipped with the clasp. This plate is connected to the tongue by a vertical strip 8. It is attached solidly by the rivets 9, to a strip 10 possessing tabs 11 which traverse the flap and are engaged in the homologous openings 12 of a part 13 which acts as a counter-plate.

Figs. 5, 6 and 7 show in detail these attachment parts, Figs. 5 and 6 representing the opposite faces of the plate 10.

The tongue is furnished with a boss directed toward the interior (Figs. 2 and 4) and constituted by two ramps 14 and 15 inclined in opposite directions and meeting at an edge 16 perpendicular to the longitudinal direction of the tongue.

The female case represented in Figs. 3, 8, 9 and 10 is constituted by a part 17 forming a bridge over a lower plate 18. The interior dimensions of the bridge are in relation to those of the tongue. The upper face 19 of the bridge terminates in its forward part in a rectilinear edge 20 obtained by flanging the edge of the upper face 19 at an incline of about 45 degrees downward and forward. The bridge 17 is bound to the lower plate 18 by two tabs 21 extending from the middle of its lateral walls and engaged in the homologous openings 22 of the plate 18, under which they are flattened out. Likewise, the tabs 23 framing the tabs 21 are engaged in the openings 24 of plate 18 and traverse the body of the object to which the case is attached; finally they pass into the homologous openings 25 of a plate 26 playing the role of a counter-plate, under which they are flattened out.

As is shown in Fig. 9, the plate 18 is cut in its center in such a way as to form a longitudinal strip 27 which acts as a spring. This strip presents at its forward end a longitudinal profile analogous to that of the tongue, but directed in the opposite direction. The position of the summit, that is, of the intermediate edge 28 between the ramps 29 and 30 of the strip 27, is such that the said bend is situated slightly behind the edge 16 in closed position.

Fig. 11 shows the profile of the clasp device mounted on a brief case, for example. The body 31 of the brief case is gripped by the tabs 23 between the plate 18 and the counterplate 26, whereas the flap 32 is held between the plate 7 of the tongue 3 and the counter-plate 13.

The manner in which the device functions is demonstrated by Figs. 12, 13, 14 and 15. In Fig. 12 the device is in closed position; the spring 27 presses the tongue 4 under the upper face 19 of the case. The rim 20 butts against the rear ramp 6 of the roll and prevents the system from opening. Fig. 13 shows the first phase of opening. A slight pressure exerted by the operator along arrow F, i. e. on the forward, rounded part 5 of the roll, disengages the tongue, which is displaced slightly from left to right in such a way that the edge 16 is freed from the corresponding edge 28 of the strip 27. At the same time the rim 20 presses on the rounded zone 5 of the roll. The 45 degree incline of rim 20 favors the sliding, whereas the ramp 14 experiences the pressure of the spring 27 and slides on the ramp 30 of the latter, which ramp presents perceptibility the same incline. As a result, once it is brought to the position represented in Fig. 13, the tongue moves by itself to the position represented in Fig. 14, and even to the position represented in Fig. 15, i. e. total disengagement, thanks to the ejection of the spring and the combination of ejecting slopes.

This ultra-rapid disengagement, obtained by a simple pressure exerted by one finger of the operator on the end of the tongue, constitutes one of the principal advantages of the invention's clasp.

Since certain obvious modifications may be made in the device without departing from the scope of the invention, it is intended that all matter contained herein be interpreted in an illustrative and not in a limiting sense.

I claim:

1. A clasp device for brief cases, carrying cases and the like comprising: a tongue member adapted at one end to be secured to the cover of a brief case, carrying case or the like and having at the other end a projection on its upper face and a socket member adapted for attachment to the body of a brief case, carrying case or the like, having a case portion and a base portion defining a cavity opening at opposite ends for receiving said tongue member, said socket member including a spring member for urging said tongue member against a wall of said case portion when said tongue is disposed in said cavity in engaged position, said tongue being held against said wall with said projection in engagement with an edge of said case portion at an end of the cavity opposite to that through which the tongue was inserted, said tongue being provided on its under face with an embossment providing two flat inclined ramps joined at an edge which is perpendicular to the length of the tongue and wherein the spring in the socket member has an embossment also presenting two flat inclined ramps joined at a similar edge which is perpendicular to the length of the tongue, said embossments being in engagement with each other when the tongue extends through the socket member with the projecting portion of the tongue in locking engagement with an edge of the case portion.

2. A clasp in accordance with claim 1 wherein when the tongue member is in locked position in the socket member the embossment on the tongue engages the embossment on the spring so as to dispose the rearward ramp of the tongue embossment in engagement with forward ramp of the spring embossment adjacent the forward ends of the embossments.

3. A clasp device in accordance with claim 2 wherein the projecting portion at one end of the tongue member has an inclined ramp and the socket member includes a cooperating ramp whereby the ramp on the projection of said tongue member and the ramp within the socket member cooperate to facilitate snap fastener closure of the clasp.

4. A clasp for brief cases, carrying cases and the like comprising: a tongue formed from sheet metal adapted for attachment at one end to the cover of a brief case, carrying case or the like having downwardly extending wings on the side edges and a rolled over portion at the other end providing a rounded nose and a projection extending above the tongue, an upwardly extending portion at said one end of the tongue, and a downwardly extending embossment intermediate the ends of the tongue presenting two inclined ramps joined at an edge perpendicular to the length of the tongue and a female member comprising a base portion and a case member adapted for attachment to the body of a brief case, carrying case or the like, said case member having a central portion and downwardly extending side portions cooperating with the base member to provide a cavity for receiving said tongue, said central portion of said case member having rim portions at opposite ends of the cavity, the rim portion at one end providing an inclined plane within the cavity, said base portion having an integral spring disposed in the cavity, said spring being provided with an embossment presenting two inclined ramps joined at an edge which is perpendicular to a line extending between opposite ends of the cavity, said spring urging its embossment into engagement with said tongue embossment when the tongue is disposed in locked position within the female member such that said edge of said spring embossment is disposed slightly to the rear of the corresponding edge of said tongue embossment.

5. A clasp device for brief cases, carrying cases and the like comprising: a tongue member adapted at one end to be secured to the cover of a brief case, carrying case or the like and having at the other end a projection on its upper face and a socket member adapted for attachment to the body of a brief case, carrying case or the like, having a case portion and a base portion defining a cavity opening at opposite ends for receiving said tongue member, said socket member including a spring member for urging said tongue member against a wall of said case portion when said tongue is disposed in said cavity in engaged position, said tongue being held against said wall with said projection in engagement with an edge of said case portion at an end of the cavity opposite to that through which the tongue was inserted, said tongue member having two flat inclined ramps joined at an edge which is perpendicular to the length of said tongue member, said spring member engages said ramps such that when said tongue member is fully inserted into the socket member the point of such engagement is slightly displaced from said edge such that the tongue member is held within the socket member and that a slight displacement of said tongue member out of the socket member will cause the point of engagement to shift from one ramp to the other thereby causing the pressure of the spring member against the tongue member to urge the tongue member out of engagement with the socket member.

References Cited in the file of this patent

UNITED STATES PATENTS

| 1,590,400 | Widmer | June 29, 1926 |
| 2,137,531 | Jones | Nov. 22, 1938 |

FOREIGN PATENTS

| 107,645 | Sweden | June 15, 1943 |